UNITED STATES PATENT OFFICE.

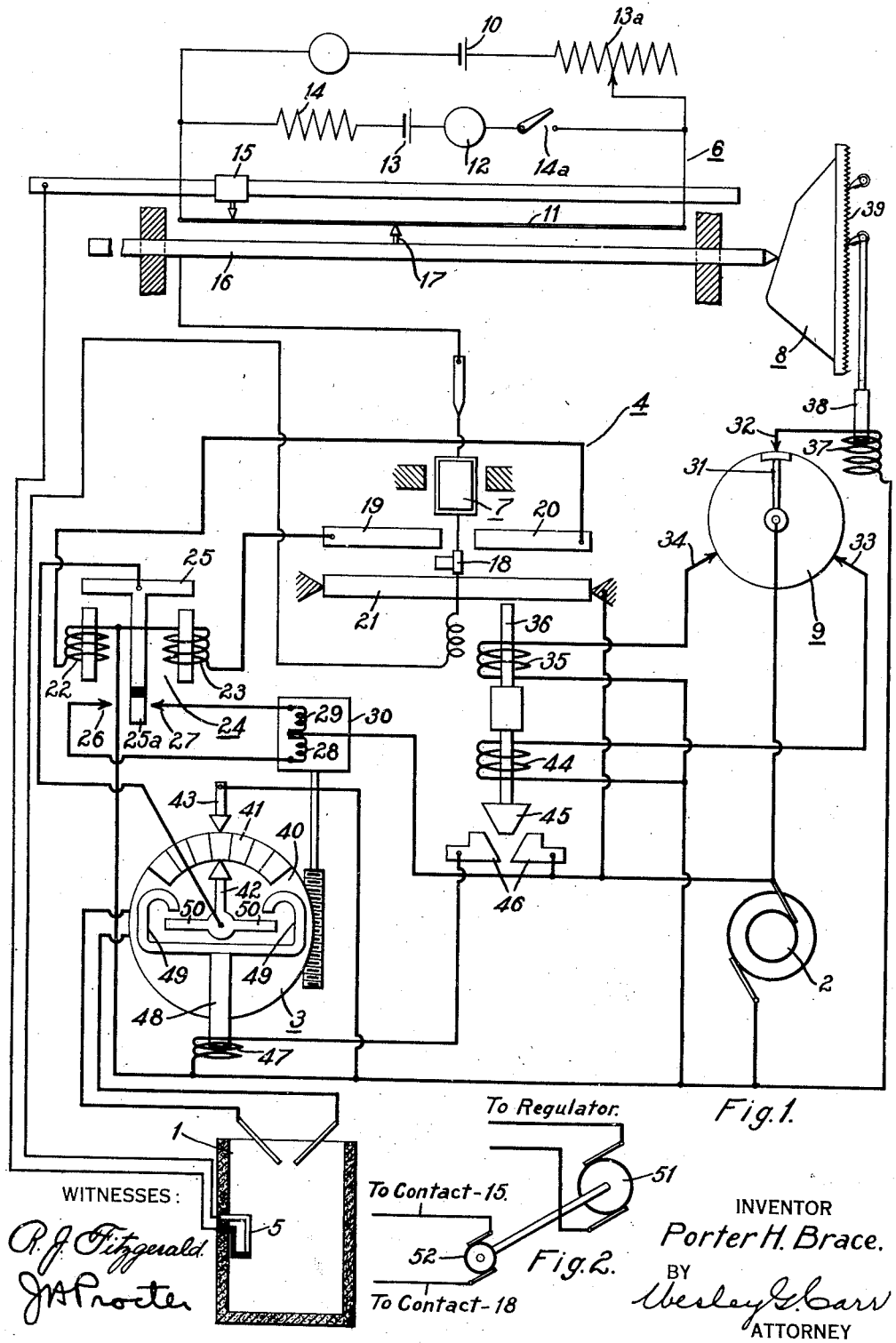

PORTER H. BRACE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATING DEVICE.

1,248,444.

Specification of Letters Patent.

Patented Dec. 4, 1917.

Application filed March 8, 1917. Serial No. 153,296.

*To all whom it may concern:*

Be it known that I, PORTER H. BRACE, a citizen of the United States, and a resident of E. E., Pittsburgh, in the county of Allegheny and State of Pennsylvania, have invented a new and useful Improvement in Regulating Devices, of which the following is a specification.

My invention relates to regulating devices and particularly to means for controlling mechanisms or apparatus in accordance with predetermined conditions.

One object of my invention is to provide means whereby a mechanism or device may be caused to be controlled or actuated in response to either physical, electrical, chemical or other predetermined conditions.

Another object of my invention is to provide means of the above indicated character that shall be adapted to so control the temperature of a device the temperature of which is to be regulated that the temperature may be caused to vary in accordance with any desired time-temperature characteristic.

A further object of my invention is to provide a device of the above indicated character that shall be efficient and accurate in its operation.

In the heat treatment of metals, it is desirable to maintain the metals at different temperatures during different parts of the operation. That is, in annealing metals, it is desirable to cool the metals gradually in accordance with a predetermined time-temperature curve. Also, it may be desirable, in other operations, to gradually increase the temperature over a predetermined time or to maintain the temperature substantially constant. Similarly, it is frequently desirable to cause a motor to operate at a predetermined speed at one time and at different speeds at other times. Also, it may be desirable to control the pressure in a fluid-containing tank or conduit in accordance with predetermined conditions.

In the carrying out of my invention, I provide a potentiometer conductor, a thermo-couple or generator that is subjected to the temperature of the device the temperature of which is to be regulated or that is actuated in accordance with other varying conditions, such as speed, pressure or energy, and a galvanometer for controlling the operation of a potential regulator or other regulating device. The galvanometer is connected in series with the thermo-couple or generator, and the circuit, thus constituted, is connected to the potentiometer conductor. A periodically actuated cam device having a contour corresponding to the desired time-temperature or other predetermined curve is adapted to so change the connections of the series-connected circuit, with respect to the potentiometer conductor, that the galvanometer is adapted to control the potential regulator or other regulating device to cause the temperature, pressure, speed or energy to vary in accordance with the predetermined desired characteristics.

Figure 1 of the accompanying drawings is a diagrammatic illustration of a temperature-regulating device embodying my invention, and Fig. 2 is a diagrammatic view of a speed-regulating device embodying my invention.

In Fig. 1 of the drawings, an electric annealing or heat-treating furnace 1 is supplied with energy from a generator 2 through an induction regulator 3 that is adapted to be controlled by a controlling device 4.

The controlling or regulating device 4 comprises, in general, a thermo-couple 5 that is subjected to the temperature of the furnace 1, a potentiometer 6, a galvanometer 7, a cam device 8 and a time-controlled contact-making-and-breaking device 9.

The potentiometer 6 comprises a source 10 of electromotive force, a potentiometer conductor 11, a galvanometer 12, a standard cell 13, resistors 13ᵃ and 14, and a switch 14ᵃ. The thermo-couple 5 and the galvanometer 7 are connected in series, and one terminal of the circuit, thus constituted, is connected to a contact member 15, and the other terminal of the circuit, thus constituted, is connected to a movable rod 16. The rod 16 is provided with a contact member 17 that is adapted to engage the potentiometer conductor 11, and the rod is adapted to be actuated by the cam 8, substantially as hereinafter more fully set forth.

The galvanometer 7 is provided with a movable contact member 18, stationary contact members 19 and 20 and a movable clamping member 21. The member 18 is adapted to be clamped into engagement with the members 19 and 20 in accordance with the indication of the galvanometer 7. That is, the member 21 is adapted to be periodically actuated for the purpose of completing a circuit through the windings 22 and 23 of a relay device 24. The relay device 24 comprises a pivotally-mounted core member 25, the actuating windings 22 and 23, and stationary contact members 26 and 27 that are adapted to be engaged by a movable contact member 25ª. The contact members 26 and 27 are operatively connected to the respective terminals of the windings 28 and 29 of a motor 30. The member 21 and the other terminals of the windings 28 and 29 are connected to one terminal of the generator 2.

The contact-making-and-breaking device 9 is adapted to be actuated by a clock (not shown) and comprises a movable contact member 31 and three stationary contact members 32, 33 and 34. The stationary contact member 34 is connected, through an electromagnet winding 35, to one terminal of the generator 2 the other terminal of which is connected to the movable contact member 31. The winding 35 is adapted to actuate a movable core member 36 for the purpose of moving the clamping member 21 periodically. The stationary contact member 32 is operatively connected, through an electromagnet winding 37, to one terminal of the generator 2. The winding 37 is adapted to actuate a movable core member 38 for the purpose of moving the cam member 8 with a step-by-step movement. That is, the movable core member 38 is operatively connected, through a tooth-and-rack device 39, to the cam member 8 for the purpose of causing the rod 16 and, consequently, the contact member 17 to be actuated in accordance with a predetermined time-temperature curve corresponding to the contour of the cam 8.

The motor 30 is adapted to move one member of the induction regulator 3 with respect to its other member for the purpose of either increasing or decreasing the voltage that is applied to the furnace 1. When the motor 30 is actuated, a disk 40, upon which is mounted a plurality of insulated contact segments 41, is adapted to be actuated. Also, a contact member 42 is adapted to be actuated when the motor 30 turns the disk 40. A stationary contact member 43 is provided for engaging the segment that is engaged by the member 42 for the purpose of completing the circuit through the regulator 3. However, when the disk 40 is so turned by the motor 30 that the segments 41 become disengaged from the stationary contact member 43, the regulator 3 will be rendered inoperative.

When the movable contact member 31 of the device 9 engages the stationary contact member 33, a circuit is completed from the generator 2 through an electromagnet winding 44 that is adapted to move the movable core member 36 downwardly to effect engagement between a movable contact member 45 and stationary contact members 46. When the stationary contact members 46 are engaged by the movable contact member 45, a circuit is completed from one terminal of the generator 2, through an electromagnet winding 47, to the other terminal of the generator 2. The winding 47 is adapted to actuate a movable core member 48 having two arms 49 thereon that engage the one or the other of two projections 50 on the member 42 for the purpose of periodically resetting the same with respect to the stationary contact member 43 to thus periodically render the regulator 3 operative.

Since the thermo-couple 5 and the galvanometer 7 are connected in series and in opposition to each other, and the circuit, thus constituted, is connected across a source of electromotive force, it will be understood that the galvanometer 7 is actuated in accordance with the difference between the electromotive force applied to the circuit and that of the thermo-couple. Thus, if the galvanometer 7 is responsive to two values, one of which is proportional to the temperature of the device to be regulated and the other of which is responsive to any desired time-temperature characteristic, it will be understood that the galvanometer 7 will so control the relay 24 and, consequently, the induction regulator 3 that the temperature of the furnace 1 may be caused to vary in accordance with any predetermined desired conditions.

All of the current traversing the galvanometer 7 is utilized for the purpose of deflecting the contact member 18 to thus preclude the errors that are usually incident to effecting engagement and disengagement of contact members. That is, the engagement between the contact members 18, 19 and 20 is effected by the clamping member 21 that is periodically actuated from an external source of energy.

In Fig. 2 of the drawings, a motor 51, that is to be operated in accordance with a predetermined time-speed curve, is operatively connected to the generator 2 through the regulator 3 and is provided with an electric tachometer 52 that is adapted to generate a potential in accordance with the speed of the motor. If one terminal of the tachometer 52 is connected to the contact member 15 and its other terminal to the contact member 18, the galvanometer 7 will be actuated in accordance with the difference between the electromotive force applied to the circuit and that of the tachometer. Thus, the galvanometer 7 is responsive to two values, one of which is proportional to the speed of the motor 51 and the other of which is responsive to the templet 8 that corresponds to the desired speed-time curve of the motor. The galvanometer 7 will so control the relay 24 and, consequently, the regulator 3 that the speed of the motor 51 may be caused to vary in accordance with any predetermined desired conditions.

I do not limit my invention to the particular devices illustrated or to the particular applications set forth, as it may be variously modified for different adaptations without departing from the spirit and scope of the invention as set forth in the appended claims.

I claim as my invention:

1. In a controlling device, the combination with a generator responsive to the variations of the device to be controlled, and means for varying the operation of the device to be controlled, of a potentiometer conductor, an electro-responsive device connected in series with the generator and adapted to control the means for varying the operation of the device to be controlled, and means for periodically changing the connection of the generator and the electro-responsive device with respect to the potentiometer conductor to cause the operation-varying means to vary the operation of the device to be controlled in accordance with a predetermined desired operating curve.

2. In a temperature-controlling device, the combination with a thermo-couple subjected to the temperature to be controlled, and means for varying the temperature, of a potentiometer conductor, an electro-responsive device connected in series with the thermo-couple and adapted to control the means for varying the temperature, a templet for varying the connection of the thermo-couple and the electro-responsive device with respect to the potentiometer conductor, and means for so actuating the templet that the temperature-varying means is actuated in accordance with a time-temperature curve corresponding to the contour of the templet.

3. The combination with a temperature-controlling device, a thermo-couple subjected to the temperature to be controlled, and a galvanometer for controlling the temperature-controlling device, of a potentiometer conductor, said galvanometer and thermo-couple being connected in series with each other, and means for periodically varying the connection of the thermo-couple and the galvanometer to the potentiometer conductor to cause the temperature to vary in accordance with predetermined conditions.

4. The combination with an electro-responsive controlling device, a thermo-couple connected in series relation to the electro-responsive device, and a source of electromotive force, of means for so varying the electromotive force that is applied to the circuit comprising the thermo-couple and the electro-responsive device that the electro-responsive controlling device is adapted to be actuated in accordance with a predetermined time-temperature curve.

5. The combination with an electro-responsive controlling device, a thermo-couple connected in series relation to the electro-responsive device, and a source of electromotive force, of a periodically actuated means for varying the electromotive force that is applied to the thermo-couple and the electro-responsive device to cause the electro-responsive device to be actuated in accordance with a predetermined time-temperature curve.

6. In a temperature-controlling device, the combination with a thermo-couple subjected to the temperature to be controlled, an electro-responsive device, and a source of electromotive force, said electro-responsive device being supplied with a potential equal to the difference between the potential of the source of electromotive force and the potential of the thermo-couple, of means for periodically varying the value of the source of electro-motive force in accordance with predetermined conditions.

7. In a temperature-controlling device, the combination with a thermo-couple subjected to the temperature to be controlled, an electro-responsive device, and a source of electromotive force, said electro-responsive device being supplied with a potential equal to the difference between the potential of the source of electromotive force and the thermo-couple, of means for causing the value of the source of electromotive force to be varied to cause the electro-responsive device to be actuated in accordance with a predetermined time-temperature curve.

8. The combination with an electro-responsive controlling device, a generator connected in series relation to the electro-responsive device, and a source of electromotive force, of means for so varying the electromotive force that is applied to the circuit comprising the generator and the electro-responsive device that the electro-responsive controlling device is adapted to be actuated in accordance with a predetermined desired curve.

9. In a controlling device, the combination with a generator adapted to be actuated in accordance with the device to be controlled, an electro-responsive device, and a source of electromotive force, said electro-responsive device being supplied with a potential equal to the difference in the potential of the source of electromotive force and the potential of the generator, of means for periodically varying the potential of the source of electromotive force in accordance with predetermined conditions.

In testimony whereof, I have hereunto subscribed my name this 27th day of Feb., 1917.

PORTER H. BRACE.